Aug. 9, 1932.   V. B. JONES   1,870,851
CONTROL SYSTEM
Filed Aug. 30, 1929
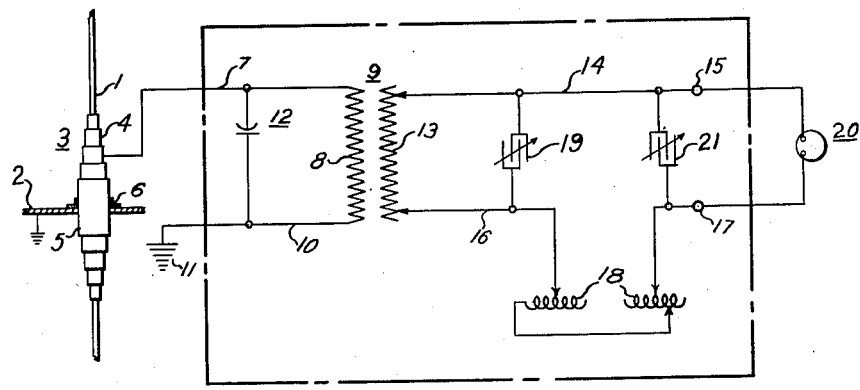
INVENTOR
Vivan B. Jones
ATTORNEY Patented Aug. 9, 1932

1,870,851

UNITED STATES PATENT OFFICE

VIVAN B. JONES, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed August 30, 1929. Serial No. 389,331.

My invention relates to electrical control systems and more particularly to control systems deriving their operating power from a condenser-type bushing or any other form of capacitor.

My invention has for an object to improve the voltage regulation of the output of a condenser control system.

Another object of my invention is to increase the permissible volt-ampere burden that can be normally energized by a condenser control system.

My invention may be more readily understood if the accompanying drawing is referred to in connection with the following description.

The single figure of the drawing is a diagrammatic view of an electrical control system constructed in accordance with my invention.

Referring to the drawing, a conductor 1, which may be a lead from a high-tension alternating-current circuit, extends through a suitable aperture in a metallic tank 2, only a portion of which is shown and which may constitute the casing or housing of a transformer, circuit breaker, or the like, for connection to the electrical apparatus therein.

The casing 2 is usually and preferably grounded, as indicated, and the conductor 1 is insulated therefrom by a suitable high-tension bushing 3. In the present embodiment, and purely by way of example, I employ a bushing of the condenser type comprising a plurality of layers 4 of insulating material, having interposed therebetween layers of conducting material, such as metal foil.

The construction and operation of bushings of this type being well known, a further description thereof is believed to be unnecessary. Suffice it to say that, when the conductor 1 is energized, the layers of conducting material have a capacity effect, dependent upon the degree of energization of the conductor 1.

The outermost layer 5 of the bushing is preferably of metal and is in electrical contact with the casing 2 to which it is secured by a flanged collar 6 or any other suitable means. The conductor 1 is thereby insulated from the casing, and the conducting layers of the condenser bushing are preferably charged uniformly from the outer or grounded layer 5 to the layer adjacent to the conductor 2.

In order to derive a control potential from the bushing, therefore, the charging current between any two conducting layers or across any desired number of layers may be utilized. In the present embodiment, one of the conducting layers is tapped and, by means of a conductor 7, it is connected to one terminal of the primary winding 8 of a potential transformer 9. The other terminal of the primary is connected, by means of conductor 10, to ground, as at 11, which may be a point on the grounded tank 2. Inasmuch as the outer layer 5 of the bushing is also grounded, the primary 8 will be energized in accordance with the potential existing across the two outermost layers of the bushing.

A lightning arrester or discharge gap 12 may be connected across the conductors 7 and 10 to take care of heavy voltage surges for the protection of the control device, in the usual manner.

The secondary winding 13 of the transformer 9 may be tapped, as indicated, for purposes of adjustment, and one terminal thereof is connected, by a conductor 14, to a load terminal 15. The other terminal of the secondary winding is connected, by a conductor 16, to another load terminal 17.

In order to tune the control circuit with respect to the conductor 1, a variable series reactance device 18 is inserted in the conductor 16, and a variable condenser 19 is shunted across the secondary 13 between the conductors 14 and 16. The reactance device, being capable of a relatively fine adjustment, it is possible to tune the secondary output accurately with respect to the potential on the circuit conductor 1. The phase-shift of the derived potential resulting from the capacitance between the bushing layers of the condenser 3 may be counter-balanced by the inductance of the transformer 9 and the variable inductance 18. As a result, the derived potential will be proportional to, and in phase with, the potential existing on the conductor 1. Further, the devices 18 and 19 govern the potential in the output circuit of the transformer 9 to prevent an undue increase in potential when no load or burden is connected across the load terminals 15 and 17.

An electrical instrument 20, which may be a meter, relay, synchroscope or the like, may be connected to the load terminals 15 and 17, as indicated, for energization in accordance with the potential existing on conductor 1.

An arrangement similar to that thus far described is disclosed in copending application for Letters Patent, Serial No. 227,449, filed October 20, 1927, by John F. Peters, and assigned to Westinghouse Electric & Manufacturing Company.

It is the purpose of my invention to improve the voltage regulation and to materially increase the permissible volt-ampere burden that can be normally carried by the system disclosed in that application. To accomplish this, a second variable condenser 21 is connected across the conductors 14 and 16 adjacent to the load terminals 15 and 17. Preferably, this condenser is disposed beyond the reactance device 18, that is, between the reactance device and the electrical instrument 20.

In systems of the type disclosed in the copending application above noted, the voltage impressed upon the control device normally decreases as the load taken thereby increases, but, by providing a second condenser 21, the voltage derived from the conductor 1 and impressed upon the control device 20 is maintained substantially constant, with an increase in load, or, if desired, the system may be adjusted to cause the secondary voltage to have a rising voltage-regulation characteristic.

In addition to the above, the second condenser 21 reduces the reactive current drawn from the system and, in so doing, permits a greater normal load to be taken by the device 20. The voltage across the layers of the condenser bushing normally increases with an increase in load, but, when the second condenser 21 is added to the device, the voltage across the layers is reduced, thereby permitting a further increase in load. The capacity of the condenser 21 is preferably of such value that the lagging phase-angle characteristics caused by the inductance of the device 20 is corrected.

The addition of the variable condenser 21, in accordance with my invention, not only improves the regulation of the output voltage and increases the permissible volt-ampere burden of the device 20, but also makes a decided improvement in the operation of the control system, as a whole.

Although I have illustrated an embodiment of my invention in combination with a bushing of the condenser type, it is obviously applicable to bushings of other types embodying means for establishing a capacitor effect for energizing the primary winding of the control transformer 8, and, more broadly, is applicable to all control systems which are capacitatively coupled to an alternating-current circuit.

Many changes may be made in my invention and it may be variously modified within the spirit and scope thereof, as set forth in the appended claims.

I claim as my invention:

1. In combination with an alternating-current circuit, a control circuit including a transformer having the primary winding thereof capacitatively coupled to said circuit, an electro-responsive device and means for energizing the same from the secondary winding of said transformer comprising a circuit embodying means for tuning it with respect to the frequency of said alternating-current circuit and means for improving the voltage regulation of said control circuit and for increasing the permissible volt-ampere burden of said electro-responsive device comprising a condenser connected in parallel-circuit relation with said device.

2. In combination with an alternating-current circuit, an electrical control system, including a condenser charged in accordance with the voltage on said circuit, a transformer having its primary winding energized by the charging current across said condenser and its secondary winding connected to energize a control circuit having an electro-responsive device therein, means for tuning said control system with respect to said alternating-current circuit, and means, in addition to said tuning means, for improving the voltage regulation of said control circuit.

3. In combination with an alternating-current circuit, an electrical control system, including a condenser charged in accordance with the voltage on said circuit, a transformer having its primary winding energized by the charging current across said condenser and its secondary winding connected to energize a control circuit having an electro-responsive device therein, means for tuning said control system with respect to said alternating-current circuit, and means, in addition to said tuning means, for improving the voltage regulation of said control circuit, said means, including a capacity across said control device, for increasing the permissible volt-ampere burden of said device.

4. In an electrical control system including a condenser energized by an alternating voltage and a tuned circuit energized by said condenser, the combination with a control device connected to said tuned circuit, of a variable condenser connected across said control device for affecting the magnitude of the voltage applied by said tuned circuit to said device.

5. In combination with an alternating-current-circuit conductor, a bushing surrounding a portion of said conductor and embodying spaced conducting portions constituting a condenser charged in accordance with the potential on said conductor, of a control circuit including a transformer having the primary winding thereof connected across said conducting portions and the secondary winding thereof connected to an output circuit including an electro-responsive device, means for tuning said control circuit with respect to the frequency of the voltage on said circuit conductor, and means in said output circuit for reducing the reactive current in said control circuit resulting from the inductance of said electro-responsive device.

6. In combination with an alternating-current-circuit conductor, a bushing surrounding a portion of said conductor and embodying spaced conducting portions constituting a condenser charged in accordance with the potential on said conductor, of a control circuit including a transformer having the primary winding thereof connected across said conducting portions and the secondary winding thereof connected to an output circuit including an electro-responsive device, means in said output circuit for correcting for the phase-angle shift of the voltage derived from said condenser resulting from the capacity of said condenser, and adjustable means in said output circuit for compensating for the lagging phase-angle characteristics resulting from the inductance of said electro-responsive device.

In testimony whereof, I have hereunto subscribed my name this 16th day of August, 1929.

VIVAN B. JONES.